(12) United States Patent
Hausmann et al.

(10) Patent No.: US 8,334,033 B2
(45) Date of Patent: *Dec. 18, 2012

(54) IONOMER COMPOSITIONS WITH LOW HAZE AND HIGH MOISTURE RESISTANCE AND ARTICLES COMPRISING THE SAME

(75) Inventors: Karlheinz Hausmann, Auvernier (CH); Richard Allen Hayes, Beaumont, TX (US); Steven C. Pesek, Orange, TX (US); W Alexander Shaffer, Orange, TX (US); Charles Anthony Smith, Vienna, WV (US)

(73) Assignee: E I du Pont de Nemours and Company, Wilmington, DE (US)

( * ) Notice: Subject to any disclaimer, the term of this patent is extended or adjusted under 35 U.S.C. 154(b) by 61 days.

This patent is subject to a terminal disclaimer.

(21) Appl. No.: 12/610,881

(22) Filed: Nov. 2, 2009

(65) Prior Publication Data
US 2010/0166992 A1 Jul. 1, 2010

Related U.S. Application Data

(60) Provisional application No. 61/141,940, filed on Dec. 31, 2008.

(51) Int. Cl.
*B32B 27/32* (2006.01)
*B32B 15/08* (2006.01)
*B32B 17/10* (2006.01)
*C08F 8/00* (2006.01)
*C08F 20/06* (2006.01)

(52) U.S. Cl. ....... 428/35.7; 428/220; 428/339; 428/441; 428/500; 525/196; 524/556; 526/317.1

(58) Field of Classification Search ................ 428/35.7, 428/220, 336, 339, 441, 500; 525/196; 524/556; 526/317.1
See application file for complete search history.

(56) References Cited

U.S. PATENT DOCUMENTS

| | | | |
|---|---|---|---|
| 2,897,183 | A | 7/1959 | Christl et al. |
| 3,328,367 | A | 6/1967 | Rees |
| 3,344,014 | A | 9/1967 | Rees |
| 3,404,134 | A | 10/1968 | Rees |
| 3,471,460 | A | 10/1969 | Rees |
| 3,762,988 | A | 10/1973 | Clock et al. |
| 4,173,669 | A | 11/1979 | Ashida et al. |
| 4,619,973 | A | 10/1986 | Smith, Jr. |
| 4,663,228 | A | 5/1987 | Bolton et al. |
| 4,668,574 | A | 5/1987 | Bolton et al. |
| 4,714,253 | A | 12/1987 | Nakahara et al. |
| 4,732,944 | A | 3/1988 | Smith, Jr. |
| 4,799,346 | A | 1/1989 | Bolton et al. |
| 4,857,258 | A | 8/1989 | Georges et al. |
| 4,906,703 | A | 3/1990 | Bolton et al. |
| 4,937,035 | A | 6/1990 | Richter |
| 4,944,906 | A | 7/1990 | Colby et al. |
| 4,968,752 | A | 11/1990 | Kawamoto et al. |
| 5,002,820 | A | 3/1991 | Bolton et al. |
| 5,028,674 | A | 7/1991 | Hatch et al. |
| 5,094,921 | A | 3/1992 | Itamura et al. |
| 5,344,513 | A | 9/1994 | Takenaka |
| 5,387,635 | A | 2/1995 | Rowland et al. |
| 5,428,162 | A | 6/1995 | Nesvadba |
| 5,428,177 | A | 6/1995 | Nesvadba |
| 5,439,227 | A | 8/1995 | Egashira et al. |
| 5,452,898 | A | 9/1995 | Yamagishi et al. |
| 5,476,553 | A | 12/1995 | Hanoka et al. |
| 5,478,402 | A | 12/1995 | Hanoka et al. |
| 5,553,852 | A | 9/1996 | Higuchi et al. |
| 5,580,057 | A | 12/1996 | Sullivan et al. |
| 5,733,382 | A | 3/1998 | Hanoka |
| 5,741,370 | A | 4/1998 | Hanoka |
| 5,752,889 | A | 5/1998 | Yamagishi et al. |
| 5,759,698 | A | 6/1998 | Tanuma et al. |
| 5,762,720 | A | 6/1998 | Hanoka et al. |
| 5,763,062 | A | 6/1998 | Smith et al. |

(Continued)

FOREIGN PATENT DOCUMENTS

| | | |
|---|---|---|
| CA | 893216 A1 | 2/1972 |
| DE | 4316611 A1 | 11/1993 |
| DE | 4316622 A1 | 11/1993 |
| DE | 4316876 A1 | 11/1993 |
| EP | 0157030 A1 | 10/1985 |
| EP | 0483087 A1 | 4/1991 |
| EP | 0589839 B1 | 9/1993 |
| EP | 0591102 B1 | 9/1993 |
| EP | 0855155 B1 | 12/1996 |
| EP | 1816147 A1 | 11/2005 |

(Continued)

OTHER PUBLICATIONS

Hasch et al., "High Pressure Phase Behavior of Mixtures of Poly(Ethylene-Co-Methyl Acrylate) With Law Molecular Weight Hyrdrocarbons", Journal of Polymer Science: Part B: Polymer Physics, 1992, 1365-1373, Vol. 30.

(Continued)

*Primary Examiner* — Michael M Bernshteyn
(74) *Attorney, Agent, or Firm* — Maria M. Kourtakis; Kelly Law Registry; Tong T. Li

(57) ABSTRACT

A sodium/zinc mixed ionomer comprises carboxylate groups and a combination of counterions that consists essentially of sodium cations and zinc cations. The sodium/zinc mixed ionomer is the neutralization product of a precursor acid copolymer. The precursor acid copolymer comprises copolymerized units of an α-olefin and an α,β-ethylenically unsaturated carboxylic acid, and it has a melt flow rate of about 10 to about 4000 g/10 min. In addition, the precursor acid copolymer, when neutralized to a level of about 40% to about 90%, and when comprising counterions that consist essentially of sodium ions, produces a sodium ionomer that has a freeze enthalpy that is not detectable or that is less than about 3.0 j/g, when determined by differential scanning calorimetry. Further provided are articles comprising or prepared from the sodium/zinc mixed ionomer.

18 Claims, No Drawings

U.S. PATENT DOCUMENTS

| | | | |
|---|---|---|---|
| 5,782,703 | A | 7/1998 | Yamagishi et al. |
| 5,782,707 | A | 7/1998 | Yamagishi et al. |
| 5,788,890 | A | 8/1998 | Grey et al. |
| 5,803,833 | A | 9/1998 | Nakamura et al. |
| 5,807,192 | A | 9/1998 | Yamagishi et al. |
| 5,895,721 | A | 4/1999 | Naoumenko et al. |
| 5,958,534 | A | 9/1999 | Marbler et al. |
| 5,973,046 | A | 10/1999 | Chen et al. |
| 5,986,203 | A | 11/1999 | Hanoka et al. |
| 6,011,115 | A | 1/2000 | Miharu et al. |
| 6,114,046 | A | 9/2000 | Hanoka |
| 6,150,028 | A | 11/2000 | Mazon |
| 6,179,732 | B1 | 1/2001 | Inoue et al. |
| 6,187,448 | B1 | 2/2001 | Hanoka et al. |
| 6,187,845 | B1 | 2/2001 | Renz et al. |
| 6,191,199 | B1 | 2/2001 | Renz et al. |
| 6,207,761 | B1 | 3/2001 | Smith et al. |
| 6,238,801 | B1 | 5/2001 | Naoumenko et al. |
| 6,245,915 | B1 | 6/2001 | Wood et al. |
| 6,265,054 | B1 | 7/2001 | Bravet et al. |
| 6,268,415 | B1 | 7/2001 | Renz et al. |
| 6,319,596 | B1 | 11/2001 | Kernander et al. |
| 6,320,116 | B1 | 11/2001 | Hanoka |
| 6,353,042 | B1 | 3/2002 | Hanoka et al. |
| 6,432,522 | B1 | 8/2002 | Friedman et al. |
| 6,455,161 | B1 | 9/2002 | Regnier et al. |
| 6,500,888 | B2 | 12/2002 | Baumgartner et al. |
| 6,518,365 | B1 | 2/2003 | Powell et al. |
| 6,586,271 | B2 | 7/2003 | Hanoka |
| 6,690,930 | B1 | 2/2004 | Dupre |
| 6,699,027 | B2 | 3/2004 | Murphy et al. |
| 6,737,151 | B1 | 5/2004 | Smith |
| 6,852,792 | B1 | 2/2005 | Capendale et al. |
| 6,866,158 | B1 | 3/2005 | Sommer et al. |
| 7,005,098 | B2 | 2/2006 | Cavallaro et al. |
| 7,128,864 | B2 | 10/2006 | Kennedy, III et al. |
| 7,189,457 | B2 | 3/2007 | Anderson |
| 7,201,672 | B2 | 4/2007 | Yamagishi et al. |
| 7,763,360 | B2 | 7/2010 | Paul et al. |
| 7,951,865 | B1 | 5/2011 | Paul et al. |
| 2002/0155302 | A1 | 10/2002 | Smith et al. |
| 2002/0175136 | A1 | 11/2002 | Bouix et al. |
| 2002/0180083 | A1 | 12/2002 | Yaniger |
| 2003/0000568 | A1 | 1/2003 | Gonsiorawski |
| 2003/0044579 | A1 | 3/2003 | Bolton et al. |
| 2003/0124296 | A1 | 7/2003 | Smith |
| 2004/0011755 | A1 | 1/2004 | Wood |
| 2004/0144415 | A1 | 7/2004 | Arhart |
| 2004/0176531 | A1 | 9/2004 | Morgan et al. |
| 2005/0058498 | A1 | 3/2005 | Botto et al. |
| 2005/0129888 | A1 | 6/2005 | Kwon |
| 2005/0279401 | A1 | 12/2005 | Arhart et al. |
| 2006/0043632 | A1 | 3/2006 | Andersen |
| 2006/0057392 | A1 | 3/2006 | Smillie et al. |
| 2006/0084763 | A1 | 4/2006 | Arhart et al. |
| 2006/0141212 | A1 | 6/2006 | Smith et al. |
| 2006/0165929 | A1 | 7/2006 | Lenges et al. |
| 2006/0182983 | A1 | 8/2006 | Paul et al. |
| 2006/0273485 | A1 | 12/2006 | Higuchi et al. |
| 2007/0092706 | A1 | 4/2007 | Pesek et al. |
| 2007/0221268 | A1 | 9/2007 | Hasch |
| 2007/0282069 | A1 | 12/2007 | Egashira et al. |
| 2007/0289693 | A1* | 12/2007 | Anderson et al. ............... 156/99 |
| 2008/0017241 | A1 | 1/2008 | Anderson et al. |
| 2008/0023063 | A1 | 1/2008 | Hayes et al. |
| 2008/0023064 | A1 | 1/2008 | Hayes et al. |
| 2008/0044666 | A1 | 2/2008 | Anderson et al. |
| 2008/0058465 | A1 | 3/2008 | Chen |
| 2008/0269388 | A1* | 10/2008 | Markovich et al. ............ 524/210 |
| 2009/0023867 | A1 | 1/2009 | Nishijima et al. |
| 2009/0120489 | A1 | 5/2009 | Nishijima et al. |
| 2009/0297747 | A1 | 12/2009 | Hausmann et al. |
| 2010/0112253 | A1 | 5/2010 | Hausmann et al. |
| 2010/0166991 | A1 | 7/2010 | Hausmann et al. |

FOREIGN PATENT DOCUMENTS

| | | | |
|---|---|---|---|
| JP | 1981116047 A | | 11/1981 |
| JP | 1990094574 A | | 5/1990 |
| JP | 1991510646 B2 | | 11/1994 |
| JP | 1994322334 A | | 11/1994 |
| JP | 1996316508 A | | 11/1996 |
| JP | 1999026791 A | | 1/1999 |
| JP | 2000186114 A | * | 7/2000 |
| JP | 2001031801 A | | 2/2001 |
| JP | 2001089616 A | | 4/2001 |
| JP | 2001119047 A | | 4/2001 |
| JP | 2001119056 A | | 4/2001 |
| JP | 2001119057 A | | 4/2001 |
| JP | 2001144313 A | | 5/2001 |
| JP | 2004031445 A | | 1/2004 |
| JP | 2005034913 A | | 2/2005 |
| JP | 2005064266 A | | 3/2005 |
| JP | 2005064268 A | | 3/2005 |
| JP | 2006032308 A | | 2/2006 |
| JP | 2006036874 A | | 2/2006 |
| JP | 2006036875 A | | 2/2006 |
| JP | 2006036876 A | | 2/2006 |
| JP | 2006186237 A | | 7/2006 |
| JP | 2006190865 A | | 7/2006 |
| JP | 2006190867 A | | 7/2006 |
| WO | 9904971 A2 | | 2/1999 |
| WO | 9958334 A2 | | 11/1999 |
| WO | 00/06619 | | 2/2000 |
| WO | 0063309 A1 | | 10/2000 |
| WO | 0064670 A1 | | 11/2000 |
| WO | 02051916 A2 | | 7/2002 |
| WO | 03045186 A1 | | 6/2003 |
| WO | 2004011755 A1 | | 2/2004 |
| WO | 2004062881 A1 | | 7/2004 |
| WO | 2006002389 A1 | | 1/2006 |
| WO | 2006057771 A2 | | 6/2006 |
| WO | 2006085603 A1 | | 8/2006 |
| WO | 2006095762 A1 | | 9/2006 |
| WO | 2008010597 A1 | | 1/2008 |

OTHER PUBLICATIONS

Longworth, R., "Ionic Polymers", L. Holliday, Ed., 1975, Chapter 2, Halstead, New York (Book Not Included).

Morris, Barry., "The Stiffness of Ionomers: How It Is Achieved and Its Importance to Flexible Packaging Applications", J.C. Sep Antec, 2003, 3157, 61 (vol. 3).

Suh et al., Charge Behavior in Polyethylene-Ionomer Blends, IEEE Transactions on Dielectrics and Electrical Insulation, 1997, pp. 58-63, vol. 4, No. 1, IEEE Service Center, Piscataway, NJ, US.

PCT International Search Report and Written Opinion for International Application No. PCT/US2009/062932, Filed Nov. 2, 2009, Dated Dec. 24, 2009.

PCT International Preliminary Report on Patentability for International Application No. PCT/US09/62932, Dated Jun. 22, 2011.

ASTM International Designation D 3418-99, Standard Test Method for Transition Temperatures of Polymers by Differential Scanning Calorimetry, 1999.

ASTM International Designation D3418-03, Standard Test Method for Transition Temperatues and Enthalpies of Fusion and Crystallization of Polymers by Differential Scanning Calorimetry, 2003.

ASTM International Designation D3418-08, Standard Test Method for Transition Temperatues and Enthalpies of Fusion and Crystallization of Polymers by Differential Scanning Calorimetry, 2008.

ASTM International Designation D3417-99, Standard Test Method for Enthalpies of Fusion and Crystallization of Polymers by Differential Scanning Calorimetry (DSC), 1999.

* cited by examiner

IONOMER COMPOSITIONS WITH LOW HAZE AND HIGH MOISTURE RESISTANCE AND ARTICLES COMPRISING THE SAME

CROSS-REFERENCE TO RELATED APPLICATION

This application claims priority under 35 U.S.C. §120 to U.S. Provisional Appln. No. 61/141,940, filed on Dec. 31, 2008, which is incorporated herein by reference in its entirety.

FIELD OF THE INVENTION

The present invention relates to ionomer compositions comprising or prepared from sodium/zinc mixed ionomers and to articles, for example injection molded articles, made from the sodium/zinc mixed ionomer compositions.

BACKGROUND OF THE INVENTION

Several patents and publications are cited in this description in order to more fully describe the state of the art to which this invention pertains. The entire disclosure of each of these patents and publications is incorporated by reference herein. Ionomers are copolymers produced by partially or fully neutralizing the carboxylic acid groups of precursor or parent polymers that are acid copolymers comprising copolymerized residues of α-olefins and α,β-ethylenically unsaturated carboxylic acids. A variety of articles made from ionomers by injection molding processes have been used in our daily life.

For example, golf balls with ionomer covers have been produced by injection molding. See, e.g.; U.S. Pat. Nos. 4,714,253; 5,439,227; 5,452,898; 5,553,852; 5,752,889; 5,782,703; 5,782,707; 5,803,833; 5,807,192; 6,179,732; 6,699,027; 7,005,098; 7,128,864; 7,201,672; and U.S. Patent Appln. Publn. Nos. 2006/0043632; 2006/0273485; and 2007/0282069.

Ionomers have also been used to produce injection molded hollow articles, such as containers. See, e.g. U.S. Pat. Nos. 4,857,258; 4,937,035; 4,944,906; 5,094,921; 5,788,890; 6,207,761; and 6,866,158, U.S. Patent Publication Nos. 20020180083; 20020175136; and 20050129888, European Patent Nos. EP1816147 and EP0855155, and PCT Patent Publn. Nos. WO2004062881; WO2008010597; and WO2003045186.

Containers produced by injection molding often have thick wall structures. When ionomers are used in forming such injection molded containers, the optical properties may suffer due to the thickness of the wall. There is a need, especially in the cosmetics industry, to develop containers that are made of ionomer compositions and that have improved optical properties. In addition, it would be further advantageous for the ionomer composition to have high moisture resistance.

SUMMARY OF THE INVENTION

Provided is an ionomer composition comprising a sodium/zinc mixed ionomer that is the neutralization product of a precursor acid copolymer. The sodium/zinc mixed ionomer comprises carboxylate groups and a combination of counterions that comprises about 5 to about 95 equivalent % of sodium cations, and, complementarily, about 5 to about 95 equivalent % of zinc cations, based on the total number of equivalents of carboxylate groups in the sodium/zinc mixed ionomer.

The precursor acid copolymer comprises copolymerized units of an α-olefin having 2 to 10 carbon atoms and about 20 to about 30 wt % of copolymerized units of an α,β-ethylenically unsaturated carboxylic acid having 3 to 8 carbon atoms, based on the total weight of the precursor acid copolymer. The precursor acid copolymer has a melt flow rate of about 70 to about 1000 g/10 min, as determined in accordance with ASTM D1238 at 190° C. and 2.16 kg. In addition, when the precursor acid copolymer is neutralized to a level of about 40% to about 90%, based on the total number of the carboxylic acid groups present in the precursor acid copolymer, with a base comprising cations that consist essentially of sodium cations, thus producing a sodium ionomer, the resulting sodium ionomer has a freeze enthalpy that is not detectable or that is less than about 3.0 j/g, when determined by differential scanning calorimetry in accordance with ASTM D3418.

Further provided are articles comprising or prepared from the ionomer composition.

DETAILED DESCRIPTION OF THE INVENTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at a level that is appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

Unless otherwise specified under limited circumstances, all melt flow rates are measured according to ASTM method D1238 at a polymer melt temperature of 190° C. and under a weight of 2.16 kg. Moreover, the terms melt flow rate (MFR), melt flow index (MFI) and melt index (MI) are synonymous and used interchangeably herein.

The terms "freeze enthalpy", "heat of crystallization" and "enthalpy of crystallization", as used herein, are synonymous and interchangeable. The terms "heat of crystallization" and "enthalpy of crystallization" are defined in ASTM Method No. D3418, published in Dec. 2008.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers consisting essentially of three monomers.

The term "acid copolymer" as used herein refers to a polymer comprising copolymerized units of an $\alpha$-olefin, an $\alpha,\beta$-ethylenically unsaturated carboxylic acid, and optionally other suitable comonomer(s) such as, an $\alpha,\beta$-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

Finally, the term "ionomer" as used herein refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a sodium ionomer (or sodium neutralized ionomer), for example a copolymer of ethylene and methacrylic acid wherein all or a portion of the carboxylic acid groups of the copolymerized methacrylic acid units are in the form of sodium carboxylate groups.

Provided herein is an ionomer composition comprising or prepared from a sodium/zinc mixed ionomer. The sodium/zinc mixed ionomer is an ionic, neutralized derivative of a precursor acid copolymer. The precursor acid copolymer comprises copolymerized units of an $\alpha$-olefin having 2 to 10 carbons and copolymerized units of an $\alpha,\beta$-ethylenically unsaturated carboxylic acid having 3 to 8 carbon atoms. Preferably, the precursor acid copolymer comprises about 20 to about 30 wt %, or about 20 to about 25 wt %, based on the total weight of the precursor acid copolymer, of the copolymerized carboxylic acid. The amount of copolymerized $\alpha$-olefin is complementary to the amount of copolymerized carboxylic acid and other comonomers, if present, so that the sum of the weight percentages of the comonomers in the precursor acid copolymer is 100 wt %.

Suitable $\alpha$-olefin comonomers include, but are not limited to, ethylene, propylene, 1-butene, 1-pentene, 1-hexene, 1-heptene, 3 methyl-1-butene, 4-methyl-1-pentene, and the like and combinations of two or more of these $\alpha$-olefins. In preferred copolymers, the $\alpha$-olefin is ethylene.

Suitable $\alpha,\beta$-ethylenically unsaturated carboxylic acid comonomers include, but are not limited to, acrylic acids, methacrylic acids, itaconic acids, maleic acids, maleic anhydrides, fumaric acids, monomethyl maleic acids, and combinations of two or more of these acid comonomers. Preferably, the $\alpha,\beta$-ethylenically unsaturated carboxylic acid is selected from acrylic acids, methacrylic acids, and combinations of two or more (meth)acrylic acids.

The precursor acid copolymer may further comprise copolymerized units of other comonomer(s), such as unsaturated carboxylic acids having 2 to 10, or 3 to 8 carbon atoms, or derivatives thereof. Suitable acid derivatives include acid anhydrides, amides, and esters. Some suitable precursor acid copolymers further comprise an ester of the unsaturated carboxylic acid. Exemplary esters of unsaturated carboxylic acids include, but are not limited to, methyl acrylates, methyl methacrylates, ethyl acrylates, ethyl methacrylates, propyl acrylates, propyl methacrylates, isopropyl acrylates, isopropyl methacrylates, butyl acrylates, butyl methacrylates, isobutyl acrylates, isobutyl methacrylates, tert-butyl acrylates, tert-butyl methacrylates, octyl acrylates, octyl methacrylates, undecyl acrylates, undecyl methacrylates, octadecyl acrylates, octadecyl methacrylates, dodecyl acrylates, dodecyl methacrylates, 2-ethylhexyl acrylates, 2-ethylhexyl methacrylates, isobornyl acrylates, isobornyl methacrylates, lauryl acrylates, lauryl methacrylates, 2-hydroxyethyl acrylates, 2-hydroxyethyl methacrylates, glycidyl acrylates, glycidyl methacrylates, poly(ethylene glycol)acrylates, poly(ethylene glycol)methacrylates, poly(ethylene glycol)methyl ether acrylates, poly(ethylene glycol)methyl ether methacrylates, poly(ethylene glycol)behenyl ether acrylates, poly(ethylene glycol)behenyl ether methacrylates, poly(ethylene glycol) 4-nonylphenyl ether acrylates, poly(ethylene glycol) 4-nonylphenyl ether methacrylates, poly(ethylene glycol) phenyl ether acrylates, poly(ethylene glycol)phenyl ether methacrylates, dimethyl maleates, diethyl maleates, dibutyl maleates, dimethyl fumarates, diethyl fumarates, dibutyl fumarates, vinyl acetates, vinyl propionates, and combinations of two or more thereof. Examples of preferred comonomers include, but are not limited to, methyl(meth)acrylates, butyl(meth)acrylates, glycidyl methacrylates, vinyl acetates, and combinations of two or more thereof. Preferably, however, the precursor acid copolymer does not incorporate other comonomers in any significant amount.

The precursor acid copolymer may have a melt flow rate (MFR) of about 10 to about 4000 g/10 min, about 10 to about 2500 g/10 min, about 10 to about 1400 g/10 min, about 35 to about 1200 g/10 min, about 70 to about 1000 g/10 min, about 100 to about 500 g/10 min, or about 200 to about 500 g/10 min, as determined in accordance with ASTM method D1238 at 190° C. and under a weight of 2.16 kg.

Combinations of precursor acid copolymers are also suitable, provided that the properties of the precursor acid copolymers are within the ranges described herein. For example, two or more dipolymers having differing amounts of copolymerized carboxylic acid comonomer or differing melt indices may be used. Also, a combination of precursor acid copolymers including a dipolymer and a terpolymer may be suitable.

The precursor acid copolymers may be synthesized in a continuous process in which each of the reactive comonomers and the solvent system, i.e., the solvent(s), if any, are continuously fed, together with initiator, into a stirred reactor. The choice of initiator is based on the anticipated reactor temperature range coupled with the decomposition temperature of the initiator, the criteria for this selection being well-understood in the industry. In general, during the synthesis by copolymerization of ethylene and acid comonomers to produce the precursor acid copolymer, the reaction temperature may be maintained at about 120° C. to about 300° C., or about 140° C. to about 260° C. The pressure in the reactor may be maintained at about 130 to about 310 MPa, or about 165 to 250 MPa.

The reactor may be, for example, an autoclave such as those described in U.S. Pat. No. 2,897,183. Specifically, U.S. Pat. No. 2,897,183 describes a type of autoclave that is equipped with means for intensive agitation. It also describes a continuous process for the polymerization of ethylene under a "substantially constant environment." This environment is maintained by keeping certain parameters for example, pressure, temperature, initiator concentration and the ratio of polymer product to unreacted ethylene, substantially constant during the polymerization reaction. Such conditions may be achieved in any of a variety of continuously stirred tank reactors, among them, for example, continuously stirred isothermal reactors and continuously stirred adiabatic reactors.

The reaction mixture, which contains the ethylene copolymer product, is vigorously agitated and continuously removed from the autoclave. After the reaction mixture leaves the reaction vessel, the resulting ethylene copolymer product is separated from the volatile unreacted monomers and solvents, if any, by conventional procedures, such as by vaporizing the unpolymerized materials and solvents under reduced pressure or at an elevated temperature.

In general, to obtain the sodium/zinc mixed ionomers described herein, during the polymerization reaction, the reactor contents should be maintained under conditions such that a single phase is present substantially throughout the reactor. This can be accomplished by adjusting reactor temperature, by adjusting reactor pressure, by addition of co-solvents, or by any combination of these techniques, as described in U.S. Pat. No. 5,028,674. Conventional means may be used to determine whether a single phase is maintained substantially throughout the reactor. For example, Hasch et al., in "High-Pressure Phase Behavior of Mixtures of Poly(Ethylene-co-Methyl Acrylate) with Low-Molecular Weight Hydrocarbons", Journal of Polymer Science: Part B: Polymer Physics, Vol. 30, 1365-1373 (1992), describe a cloud-point measurement that can be used in determining the boundary between single-phase and multiphase conditions.

When the precursor acid copolymer is neutralized with a sodium ion-containing base to a level of about 40% to about 90%, or about 40% to about 70%, or about 43% to about 60%, based on the total carboxylic acid content of the precursor acid copolymers as calculated or measured for the non-neutralized precursor acid copolymers, and when the resulting sodium neutralized ionomer has a MFR of about 0.7 to about 25 g/10 min or less, or about 0.7 to about 19 g/10 min or less, or about 1 to about 10 g/10 min, or about 1.5 to about 5 g/10 min, or about 2 to about 4 g/10 min, as determined in accordance with ASTM method D1238 at 190° C. and 2.16 kg, then the resulting sodium ionomer has a freeze enthalpy that is not detectable or less than about 3 j/g, or less than about 2 j/g, as determined by differential scanning calorimetry (DSC) in accordance with ASTM method D3418 when using a DSC apparatus manufactured by Mettler or by TA (for example the Universal V3.9A model). The term "not detectable", as used in this context, refers to a freeze enthalpy that produces no observable inflection in the DSC curve. Alternatively, the peak height may be very small and the peak width at half height may be relatively great, so that a broad peak having a small integral area may not be detectable or discernable when a baseline is subtracted from the DSC trace. In general, when ASTM D3418 is followed, a freeze enthalpy that falls below 0.2 j/g is not detectable. The precursor acid copolymers and their sodium ionomers are described in detail in Applicants' co-pending U.S. patent application No. 12/610,678, filed on Oct. 31, 2008, and published as U.S. patent Appln. Publn. No. 2010/0112253.

To obtain the sodium ionomers, the zinc ionomers or the sodium/zinc mixed ionomers described herein, the precursor acid copolymers may be neutralized by any conventional procedure, such as those described in U.S. Pat. Nos. 3,404,134 and 6,518,365. For example, the precursor acid copolymer may be neutralized with a combination of sodium ion-containing bases and zinc ion-containing bases to provide an ionomer wherein about 20% to about 90%, or about 30% to about 90%, or about 40% to about 70%, or about 43% to about 60%, of the hydrogen atoms of carboxylic acid groups of the precursor acid copolymers are replaced by a combination of counterions that comprises zinc and sodium cations. That is, the acid groups are neutralized to a level of about 20% to about 90%, or about 30% to about 90%, or about 40% to about 70%, or about 43% to about 60%, based on the total carboxylic acid content of the precursor acid copolymers as calculated or measured for the non-neutralized precursor acid copolymers. The combination of sodium and zinc cations present in the resulting ionomers may comprise about 1 to about 99 equiv %, or about 5 to about 95 equiv %, or about 50 to about 95 equiv %, or about 50 to about 80 equiv %, or about 50 to about 70 equiv %, or about 50 to about 60 equiv %, or about 55 to about 80 equiv %, or about 55 to about 70 equiv %, or about 60 to about 70 equiv %, of the sodium cations, based on the number of equivalents of carboxylate anions in the ionomer, with the balance of the equivalent percentage being made up of the zinc cations.

Other means to form the sodium/zinc mixed ionomer will be apparent to those of ordinary skill in the art. For example, the mixed ionomer may also be prepared by first neutralizing the precursor acid copolymer with an appropriate amount of a sodium ion-containing base, such as a solution of sodium hydroxide, and then an appropriate amount of a zinc ion-containing base, such as a solution of zinc acetate. Alternatively, the sodium/zinc mixed ionomer may be prepared by first neutralizing the precursor acid copolymer with an appropriate amount of a zinc ion-containing base, such as a solution of zinc acetate, and then an appropriate amount of a sodium ion-containing base, such as a solution of sodium hydroxide.

The sodium/zinc mixed ionomer may also be prepared by melt blending a sodium ionomer and a zinc ionomer, each derived from a precursor acid copolymer as described above, provided that the resulting sodium/zinc mixed ionomer has a total of about 20% to about 90%, or about 30% to about 90%, or about 40% to about 70%, or about 43% to about 60%, of the hydrogen atoms of the carboxylic acid groups present in the two precursor acid copolymers replaced by metal cations and that the ratio of sodium and zinc cations is as described above. In one specific example, the sodium/zinc mixed ionomer is prepared by melt blending a sodium ionomer, in which about 30 to about 90 equiv %, or about 40 to about 70 equiv %, or about 43 to about 60 equiv %, of the hydrogen atoms of the carboxylic acid groups present in its precursor acid copolymer are replaced by sodium cations, and a zinc ionomer, in which about 30 to about 90 equiv %, or about 40 to about 70 equiv %, or about 43 to about 60 equiv %, of the hydrogen atoms of the carboxylic acid groups present in its precursor acid copolymer are replaced by a charge-equivalent amount of zinc cations.

The resulting sodium/zinc ionomer may have a MFR of about 35 g/10 min or less, or about 0.7 to about 35 g/10 min or less, or about 0.7 to about 25 g/10 min or less, or about 0.7 to about 19 g/10 min or less, or about 1 to about 10 g/10 min, or about 1.5 to about 5 g/10 min, or about 2 to about 4 g/10 min, as determined in accordance with ASTM method D1238 at 190° C. and 2.16 kg.

The sodium/zinc mixed ionomer composition described herein may further contain any suitable additive known in the art. Such additives include, but are not limited to, plasticizers, processing aides, flow enhancing additives, flow reducing additives (e.g., organic peroxides), lubricants, pigments, dyes, optical brighteners, flame retardants, impact modifiers, nucleating agents, antiblocking agents (e.g., silica), thermal stabilizers, hindered amine light stabilizers (HALS), UV absorbers, UV stabilizers, dispersants, surfactants, chelating agents, coupling agents, adhesives, primers, reinforcement additives (e.g., glass fiber), fillers, and the like, and mixtures or combinations of two or more conventional additives. These additives are described in the *Kirk Othmer Encyclopedia of Chemical Technology*, 5$^{th}$ Edition, John Wiley & Sons (New Jersey, 2004), for example.

These conventional ingredients may be present in the compositions in quantities of about 0.01 to about 15 wt %, or about 0.01 to about 10 wt %, so long as they do not detract from the basic and novel characteristics of the composition and do not significantly adversely affect the performance of the composition or of the articles prepared from the composition. In this connection, the weight percentages of such additives are not included in the total weight percentages of the thermoplastic compositions defined herein. Typically, many such additives may be present at about 0.01 to about 5 wt %, based on the total weight of the ionomer composition.

The optional incorporation of such conventional ingredients into the compositions can be carried out by any known process. This incorporation can be carried out, for example, by dry blending, by extruding a combination of the various constituents, by a masterbatch technique, or the like. See, again, the *Kirk-Othmer Encyclopedia*.

Three notable additives are thermal stabilizers, UV absorbers and HALS. Thermal stabilizers can be used and have been widely described in the art. Any known thermal stabilizer may find utility in the ionomer compositions described herein. Preferred classes of thermal stabilizers include, but are not limited to, phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds that destroy peroxide, hydroxylamines, nitrones, thiosynergists, benzofuranones, indolinones, and the like and combinations of two or more thereof. The sodium/zinc mixed ionomer compositions may contain any effective amount of thermal stabilizer(s). Use of a thermal stabilizer is optional and in some instances is not preferred. When one or more thermal stabilizers are used, they may be present in the ionomer compositions at a level of at least about 0.05 wt %, and up to about 10 wt %, or up to about 5 wt %, or up to about 1 wt %, based on the total weight of the sodium/zinc mixed ionomer composition.

UV absorbers can be used and have also been widely described in the art. Any known UV absorber may find utility in the ionomer compositions described herein. Preferred classes of UV absorbers include, but are not limited to, benzotriazoles, hydroxybenzophenones, hydroxyphenyl triazines, esters of substituted and unsubstituted benzoic acids, and the like and combinations of two or more thereof. The sodium/zinc mixed ionomer compositions may contain any effective amount of one or more UV absorbers. Use of an UV absorber is optional and in some instances is not preferred. When UV absorber(s) are used, they may be present in the ionomer compositions at a level of at least about 0.05 wt %, and up about 10 wt %, or up to about 5 wt %, or up to about 1 wt %, based on the total weight of the sodium/zinc mixed ionomer composition.

Hindered amine light stabilizers can be used and have also been widely described in the art. Generally, hindered amine light stabilizers are secondary or tertiary, acetylated, N-hydrocarbyloxy bsubstituted, hydroxyl substituted N-hydrocarbyloxy substituted, or other substituted cyclic amines which further incorporate steric hindrance, generally derived from aliphatic substitution on the carbon atoms adjacent to the amine function. The sodium/zinc mixed ionomer compositions may contain any effective amount of one or more hindered amine light stabilizers. Use of hindered amine light stabilizers is optional and in some instances is not preferred. When hindered amine light stabilizer(s) are used, they may be present in the ionomer compositions at a level of at least about 0.05 wt %, or up to about 10 wt %, or up to about 5 wt %, or up to about 1 wt %, based on the total weight of the sodium/zinc mixed ionomer composition.

Further provided is an article comprising the sodium/zinc mixed ionomer composition described herein. Articles comprising or made from these sodium/zinc mixed ionomer compositions exhibit equal or better optical properties (e.g., equal or lower haze as determined in accordance with ASTM D1003) than those made from prior art ionomers. Moreover, the improved optical properties are not affected by the cooling rate that follows the process of fabricating the article. Further, the articles comprising or made from the sodium/zinc mixed ionomer composition also exhibit improved moisture resistance, as evidenced by a lower moisture absorption rate.

This article may be in any shape or form, such as a film or sheet or a molded article. One article is a film or sheet, which may be prepared by any convention process, such as, dipcoating, solution casting, lamination, melt extrusion casting, blown film processes, extrusion coating, tandem extrusion coating, or by any other procedures that are known to those of skill in the art. Some films or sheets are formed by melt extrusion casting, melt coextrusion casting, melt extrusion coating, blown film process, or tandem melt extrusion coating process.

Alternatively, the article comprising the sodium/zinc mixed ionomer composition may be a molded article, which may be prepared by any conventional molding process, such as, compression molding, injection molding, extrusion molding, blow molding, injection blow molding, injection stretch blow molding, extrusion blow molding and the like. Articles may also be formed by combinations of two or more of these processes, such as for example when a core formed by compression molding is overmolded by injection molding.

Information about these fabrication methods may be found in reference texts such as, for example, the *Kirk Othmer Encyclopedia*, the *Modern Plastics Encyclopedia*, McGraw-Hill (New York, 1995) or the *Wiley Encyclopedia of Packaging Technology*, 2d edition, A. L. Brody and K. S. Marsh, Eds., Wiley-Interscience (Hoboken, 1997).

In another alternative, the article comprising the sodium/zinc mixed ionomer composition described herein is an injection molded article having a minimum thickness (i.e, the thickness at the smallest dimension of the article) of at least about 1 mm. Preferably, the injection molded article may have a thickness of about 1 mm to 100 mm, or 2 mm to 100 mm, or 3 to about 100 mm, or about 3 to about 50 mm, or about 5 to about 35 mm.

In yet another alternative, the article is an injection molded article in the form of a multi-layer structure (such as an over-molded article), wherein at least one layer of the multi-layer structure comprises or consists essentially of the ionomer composition described above and that layer has a minimum thickness of at least about 1 mm. Preferably, the injection molded article may have a thickness of about 1 mm to 100 mm, or 2 mm to 100 mm, or 3 to about 100 mm, or about 3 to about 50 mm, or about 5 to about 35 mm.

In yet another alternative, the article is an injection molded article in the form of a sheet, a container (e.g., a bottle or a bowl), a cap or stopper (e.g. for a container), a tray, a medical device or instrument (e.g., an automated or portable defibrillator unit), a handle, a knob, a push button, a decorative article, a panel, a console box, or a footwear component (e.g., a heel counter, a toe puff, or a sole).

In yet another alternative, the article is an injection molded intermediate article for use in further shaping processes. For example, the article may be a pre-form or a parison suitable for use in a blow molding process to form a container (e.g., a cosmetic container). The injection molded intermediate article may be in the form of a multi-layer structure such as the one described above, and it may therefore produce a container having a multi-layer wall structure.

Injection molding is a well-known molding process. When the article described herein is in the form of an injection molded article, it may be produced by any suitable injection molding process. Suitable injection molding processes include, for example, co-injection molding and over-molding. These processes are sometimes also referred to as two-shot or multi-shot molding processes).

When the injection molded article is produced by an over-molding process, the sodium/zinc ionomer composition may be used as the substrate material, the over-mold material or both. In certain articles, when an over-molding process is used, the sodium/zinc ionomer composition described herein may be over-molded on a glass, plastic or metal container. Alternatively, the sodium/zinc ionomer compositions may be over-molded on any other articles (such as household items, medical devices or instruments, electronic devices, automobile parts, architectural structures, sporting goods, etc.) to form a soft touch and/or protective overcoating. When the over-mold material comprises the sodium/zinc ionomer composition described herein, the melt index of the ionomer is preferably from 0.75 up to about 35 g/10 min, as determined in accordance with ASTM D1238 at 190° C. and 2.16 kg. Also preferably, the precursor acid copolymer has a melt index of 200 to 500 g/10 min, as determined in accordance with ASTM D1238 at 190° C. and 2.16 kg. In addition, the ionomer preferably has a melt index of from about 0.1 to about 2.0 g/10 min or from about 0.1 to about 35 g/10 min, as determined in accordance with ASTM D1238 at 190° C. and 2.16 kg. More specifically, when an overmolded substrate comprises the sodium/zinc ionomer, the ionomer preferably has a melt index of about 0.5 to about 4 g/10 min. When the overmolding material comprises the sodium/zinc ionomer, however, the ionomer preferably has a melt index of from 0.1 g/10 min or 0.75 g/10 min or 4 g 10 min or 5 g/10 min up to about 35 g/10 min.

The sodium/zinc ionomer composition may be molded at a melt temperature of about 120° C. to about 250° C., or about 130° C. to about 210° C. In general, slow to moderate fill rates with pressures of about 69 to about 110 MPa may be used. The mold temperatures may be in the range of about 5° C. to about 50° C., preferably 5° C. to 20° C., and more preferably 5° C. to 15° C. Based on the sodium/zinc ionomer composition and the process type that is to be used, one skilled in the art would be able to determine the proper molding conditions required to produce a particular type of article.

The following examples are provided to describe the invention in further detail. These examples, which set forth a preferred mode presently contemplated for carrying out the invention, are intended to illustrate and not to limit the invention.

EXAMPLES

Comparative Examples CE1 to CE19

The ionomers used in each of the following examples were prepared as follows. First, the precursor acid copolymers (i.e., the copolymers of ethylene and methacrylic acid) of the ionomers, were produced by free radical polymerization in an adiabatic continuous stirred autoclave, substantially according to the procedure described in Example 1 of U.S. Pat. No. 5,028,674 with the following exceptions: (1) by controlling the ratio of ethylene to methacrylic acid and the flow rate of the initiator, the reactor conditions were maintained at a temperature of about 200° C. to about 260° C. and at a pressure of between 170 and 240 MPa; (2) no propane telogen was fed in the reactor (except in CE16); (3) the total concentration of methanol in the reactor was maintained at about 2 to 5 mol %, based on the total feed of ethylene, methacrylic acid, methanol and initiator solution (or based on the total feed of propane telogen, ethylene, methacrylic acid, methanol, and initiator solution in CE16); and (4) the system was maintained at a steady state with the residence time of the material flowing through the reactor being about 5 seconds to 2 minutes. In addition, depending on the particular acid copolymer to be synthesized, one of two different free-radical initiators were used, tert-butyl peracetate or tert-butyl peroctoate. When tert-butyl peracetate was the initiator (as in Comparative Examples CE1 to CE6, CE16, and CE18), it was utilized as a solution in odorless mineral spirits at 50% concentration. When tert-butyl peroctoate was the initiator (as in Comparative Examples CE7 to CE15, CE17, and CE19), it was utilized as a mixture at 90% concentration in odorless mineral spirits. The ionomers were obtained by partially neutralizing the precursor copolymers of ethylene and methacrylic acid with sodium hydroxide solution either in a single screw extruder under high shear melt mixing conditions with the melt temperature set at 200° C. to 270° C., or using the general method described in Example 1 of U.S. Pat. No. 6,518,365.

The as-obtained ionomers then underwent differential scanning calorimetry (DSC) testing in accordance with ASTM D3418 with a temperature profile of (a) heating to 180° C.; (b) holding for 3 minutes; (c) cooling to 25° C. at a rate of 10° C./min; (d) holding for 3 minutes; and (e) heating to 180° C. at a rate of 10° C./min. The freeze enthalpies for the ionomers were determined and are reported in Table 2. The results demonstrate that a freeze enthalpy for each of the sodium ionomers prepared by neutralizing the precursor acid copolymer described above using sodium ion-containing bases (Comparative Examples CE1 to CE3) was not detectable, while each of the ionomers prepared by neutralizing the prior art precursor acid copolymers (Comparative Examples CE4 to CE19) has a freeze enthalpy greater than 3 j/g.

Further, the ionomers were fed into 25 mm diameter Killion extruders under the temperature profile set forth in Table 1 and extrusion cast into polymer sheets. Specifically, the polymer throughput was controlled by adjusting the screw speed to maximum throughput, a 150 mm slot die with a nominal gap of 2 mm was fed by the extruder, the cast sheet was fed onto a 200 mm diameter polished chrome chill roll held at a temperature of between 10° C. and 15° C. and rotating at 1 to 2 rpm. The nominally 0.76 mm (30 mil) thick sheets were then removed and cut into 300×300 mm squares.

The ionomer sheets were used as interlayer sheets to form glass laminates. Specifically, annealed glass sheets (100× 100×3 mm) were washed with a solution of trisodium phosphate (5 g/l) in de-ionized water at 50° C. for 5 min, then rinsed thoroughly with de-ionized water and dried. Six sheets of each ionomer (about 0.76 mm thick) were stacked together and placed between the two lites of glass sheet to form a pre-lamination assembly having an interlayer with a total thickness of about 180 mils (4.57 mm). The moisture level of the ionomer sheets was kept below 0.06 wt % by minimizing their exposure to ambient conditions (approximately 35% RH). The pre-lamination assembly was then stabilized by the application of polyester tape in several locations to maintain relative positioning of each layer with the glass lites. A nylon fabric strip was placed around the periphery of the assembly to facilitate air removal from within the layers.

The pre-lamination assembly was placed inside a nylon vacuum bag and sealed. A connection was made to a vacuum pump and the air within the bagged assembly was substantially removed by reducing the air pressure inside the bag to below 50 millibar absolute. The bagged assembly was then heated in a convection air oven to 120° C. and maintained at these conditions for 30 min. A cooling fan was used to cool the assembly to near ambient temperature, after which the vacuum source was disconnected and the bag was removed, yielding a fully pre-pressed assembly of glass and interlayer. Although hermetically sealed around the periphery, several areas of the assembly were not fully bonded as indicated by the presence of bubbles in these areas.

The pre-pressed assembly was placed in an air autoclave and the temperature and pressure were increased from ambient to 135° C. and 13.8 bar over 15 min. The assembly was maintained at these conditions for 30 min, after which, the resulting laminate was rapidly cooled (i.e., at Cooling Condition A of 2.5° C./min) to room temperature at ambient pressure. The as-obtained laminate was tested for haze in accordance with ASTM D1003 using a Haze-gard Plus hazemeter (BYK-Gardner, Columbia, Md.). After this measurement, the same laminate was heated to 120° C. in an oven and maintained at such temperature for 2 to 3 hours before it was slowly cooled (i.e., Cooling Condition B of 0.1° C./min) to room temperature and then tested for haze.

As shown by the Comparative Examples (CE4 to CE19), the haze levels of glass laminates comprising interlayer ionomers prepared by neutralizing prior art precursor acid copolymers are dependent on the cooling rate under which the laminates were obtained. In general, a slower cooling rate increases the laminates' haze. As illustrated by the data shown in Table 2, however, glass laminates comprising interlayer sheets made from ionomers prepared by neutralizing the precursor acid copolymers described above with sodium ion-containing bases (Comparative Examples CE1 to CE3) exhibit lower haze than glass laminates comprising interlayer ionomers prepared by neutralizing the prior art precursor acid copolymers (Comparative Examples CE4 to CE19). Additionally, the haze levels of the glass laminates in Comparative Examples CE1 to CE3 were not affected by the cooling rate under which the laminates were obtained.

TABLE 1

| Extruder Zone | Temperature (° C.) |
|---|---|
| Feed | Ambient |
| Zone 1 | 100-170 |
| Zone 2 | 150-210 |
| Zone 3 | 170-230 |
| Adapter | 170-230 |
| Die | 170-230 |

TABLE 2

| Example | Single Phase[1] | MAA (wt %)[2] | MFR (Base Resin)[3] | % Neut. (Sodium)[4] | MFR (Ionomer)[5] | Freeze Enthalpy (j/g) | Laminate Haze Cooling Condition A | Laminate Haze Cooling Condition B |
|---|---|---|---|---|---|---|---|---|
| CE1 | Yes | 23 | 270 | 43 | 3.2 | n.d.[6] | 0.7 | 1.1 |
| CE2 | Yes | 23 | 270 | 52 | 0.8 | n.d.[6] | 1.2 | 1.4 |
| CE3 | Yes | 22 | 350 | 53 | 2.5 | n.d.[6] | 0.6 | 0.6 |
| CE4 | Yes | 23 | 270 | 33 | 8.2 | 3.13 | 0.9 | 9.8 |
| CE5 | Yes | 23 | 270 | 26 | 16.0 | 7.32 | 5.3 | 21.6 |
| CE6 | Yes | 23 | 270 | 14 | 40.0 | 21.97 | 5.1 | 59.1 |
| CE7 | No | 22 | 25 | 38 | 0.4 | 4.38 | 1.2 | 8.6 |
| CE8 | No | 22 | 25 | 30 | 0.9 | 13.36 | 3.4 | 11.9 |
| CE9 | No | 22 | 25 | 25 | 1.5 | 16.31 | 3.8 | 17.2 |
| CE10 | No | 22 | 25 | 20 | 2.3 | 20.95 | 3.2 | 23.5 |
| CE11 | No | 22 | 25 | 15 | 3.4 | 27.15 | 2.5 | 33.5 |
| CE12 | No | 22 | 30 | 32 | 1.2 | 10.18 | 1.9 | 10.8 |
| CE13 | No | 22 | 30 | 32 | 1.2 | 16.09 | 2.6 | 14.4 |
| CE14 | No | 22 | 25 | 26 | 1.8 | 14.22 | 1.8 | 18.7 |
| CE15 | No | 21 | 30 | 29 | 2.0 | 21.67 | 1.5 | 21.2 |
| CE16 | No | 20 | 350 | 49 | 3.2 | 4.4 | 1.1 | 12.5 |
| CE17 | No | 20 | 12 | 23 | 0.5 | 25.47 | 2.6 | 26.7 |
| CE18 | No | 19 | 225 | 45 | 4.5 | 10.81 | 3.1 | 27.5 |
| CE19 | No | 19 | 60 | 37 | 2.6 | 18.20 | 1.5 | 50.8 |

[1]During the polymerization process, a single phase was maintained throughout the reactor;
[2]Weight percent of copolymerized units of methacrylic acid comprised in the precursor acid copolymer, from which the ionomer that forms the laminate interlayer sheet is derived;
[3]The melt flow rate (MFR) of the precursor acid copolymer was calculated based on the MFR of the ionomer;
[4]% neut. Sodium is the percentage of carboxylic acid groups present in the precursor acid copolymer which have been neutralized;
[5]The melt flow rate (MFR) of the ionomer, as determined in accordance with ASTM D1238 at 190° C. and 2.16 kg;
[6]"n.d." means that the freeze enthalpy is not detectable, when measured in accordance with ASTM D3418-03.

Examples E1 to E7 and Comparative Examples CE20 to CE24

The ionomers used in Comparative Examples CE20 to CE24 were prepared in substantially the same manner as described above for Comparative Examples CE1 to CE19, except that a solution of zinc acetate or zinc oxide concentrate was used instead of the solution of sodium hydroxide in preparing the ionomers used in CE22 and CE23. In preparing the ionomers used in Examples E1 to E3, a process similar to that used in Comparative Examples CE1 to CE19 was followed, except that the precursor acid copolymer was first neutralized by injecting an appropriate amount of sodium hydroxide solution and then injecting an appropriate amount of zinc acetate solution. The ionomer used in Example E4 was prepared by melt blending 75 wt % of the ionomer used in Comparative Example CE21 and 25 wt % of the ionomer used in Comparative Example CE22. The ionomer used in Example E5 was prepared by melt blending 50 wt % of the ionomer used in Comparative Example CE21 and 50 wt % of the ionomer used in Comparative Example CE22. The ionomer used in Example E6 was prepared by melt blending 25 wt % of the ionomer used in Comparative Example CE21 and 75 wt % of the ionomer used in Comparative Example CE22. The ionomer used in Example E7 was prepared by melt blending 50 wt % of the ionomer used in Comparative Example CE22 and 50 wt % of the ionomer used in Comparative Example CE24.

Using an extrusion process similar to those described above, the ionomer resins used in Example E1 to E7 and Comparative Example CE20 to CE24 were formed into nominally 30 mil (0.76 mm) or 33 mil (0.84 mm) thick sheets and cut into 300×300 mm squares. The as-extruded ionomer squares are believed to be substantially free of water. If not used within a short time for further experiments, the ionomer squares were stored in moisture-barrier packaging (foil envelopes) in the interval.

The ionomer sheets were trimmed to dimensions of 100× 50×0.76 mm, weighed, then immersed in water at 23° C. for 1000 hours. After removal from the water, the sheets were blotted to remove residual surface moisture and then re-weighed. The difference in weight before and after water immersion divided by the sheet weight before water immersion was calculated as the moisture weight gain percent (%), which is summarized in Table 3.

Using a lamination process similar to those described above, a second set of ionomer sheets were laminated between two annealed glass sheets (100×100×3 mm) to form glass laminates and the percent haze of each laminate was determined under the conditions of Cooling Condition A or Cooling Condition B. Results are shown in Table 3. In some examples (Comparative Examples CE21, CE22, CE24, and Examples E4 to E7), after the lamination process was complete, the laminates were further processed using a protocol referred to herein as "Cooling Condition C". This protocol consists of 1) heating a laminate in an air oven by raising the temperature from ambient temperature to 70° C. over a period of 9 minutes, 2) maintaining a temperature of 70° C. for 15 minutes, 3) raising the temperature to 125° C. over a period of 55 minutes, 4) maintaining the temperature at 125° C. for 15 minutes, 5) cooling from 125° C. to 90° C. over a period of 7 minutes, 6) maintaining a temperature of 90° C. for 15 minutes, and 7) cooling from 90° C. to 25° C. over a period of 10 hours and 50 minutes. The thus-obtained laminates were then tested for percent haze. Results are shown in Table 3.

The results reported in Table 3 demonstrate that, in general, laminated sheets of zinc ionomers (Comparative Examples CE22 and CE23) tend to exhibit poorer optical properties than laminated sheets of sodium ionomers (Comparative Examples CE20, CE21, and CE24). The inclusion of zinc cations improves the moisture resistance of the resulting sodium/zinc ionomer sheets compared to that of sheets of sodium ionomers. Additionally, the inclusion of the zinc cations has no or very minimal effects on the optical properties (as shown by the lower haze levels) of the resulting mixed ionomers, especially at higher sodium/zinc cation ratios.

While certain of the preferred embodiments of the present invention have been described and specifically exemplified above, it is not intended that the invention be limited to such embodiments. Various modifications may be made without departing from the scope and spirit of the present invention, as set forth in the following claims.

TABLE 3

| Sample | MAA (wt %) | Freeze Enthalpy (j/g) | MFR (g/10 min) (Base Resin) | % Neut (Na:Zn mole ration) | MFR (g/10 min) (ionomer) | Haze (%) Cooling Rate A | Cooling Rate B | Cooling Rate C | Moisture Gain (wt %) |
|---|---|---|---|---|---|---|---|---|---|
| CE20 | 19 | 17.3 | 60 | 39 (100:0) | 2.6 | 1[1] | 22.5[1] | — | — |
| CE21 | 23.2 | — | 270 | 43.2 (100:0) | 3.2 | 0.7[1] | 1.1[1] | 0.4[2] | 9.2[3] |
| E1 | 23.2 | — | 270 | 54.6 (73.8:26.2) | 0.89 | 0.98[1] | 0.67[1] | — | 2.9[3] |
| E2 | 23.2 | 0.82 | 270 | 44.6 (65.9:44.1) | 3.1 | 1[1] | 0.73[1] | — | 0.81[3] |
| E3 | 23.2 | 4.73 | 270 | 34.8 (51.6:48.4) | 7.2 | 1.22[1] | 10.04[1] | — | 0.42[3] |
| CE22 | 23.2 | 12.74 | 270 | 34.9 (0:100) | 6.6 | 6.3[1] | 52.6[1] | 28.2[2] | 0.51[3] |
| CE23 | 19 | — | 250 | 39 (0:100) | 4 | 11.6[1] | 69.5[1] | — | — |
| E4 | 23.2 | 1.04 | 270 | 41.1 (81.1:11.9) | — | — | — | 4[2] | — |
| E5 | 23.2 | 2.80 | 270 | 39.1 (71.2:28.8) | — | — | — | 3.6[2] | — |
| E6 | 23.2 | 7.34 | 270 | 37 (45.2:54.8) | — | — | — | 11.7[2] | — |
| CE24 | 23.2 | — | 270 | 52.2 (100:0) | 0.8 | — | — | 0.9[2] | — |
| E7 | 23.2 | — | 270 | 43.6 (75:25) | — | — | — | 1.4[2] | — |

[1]The glass laminates used in these examples have three layers of 0.76 mm thick ionomer sheets sandwiched between the two glass sheets;
[2]The glass laminates used in these examples have three layers of 0.84 mm thick ionomer sheets sandwiched between the two glass sheets;
[3]The ionomer sheets used in these examples have a size of 100 × 50 × 0.76 mm.

What is claimed is:

1. A composition comprising a sodium/zinc mixed ionomer, wherein said sodium/zinc mixed ionomer is the neutralization product of a precursor acid copolymer; and wherein
   (a) the precursor acid copolymer comprises copolymerized units of ethylene and about 20 to about 30 wt % of copolymerized units of an α,β-ethylenically unsaturated carboxylic acid selected from the group consisting of acrylic acid and methacrylic acid, based on the total weight of the precursor acid copolymer; wherein the precursor acid copolymer has a melt flow rate of about 10 to about 4000 g/10 min, as determined in accordance with ASTM D1238 at 190° C. and 2.16 kg; wherein the precursor acid copolymer, being neutralized to a level of about 40% to about 90% based on the total number of the carboxylic acid groups present in the precursor acid copolymer, produces a sodium ionomer, said sodium ionomer comprising carboxylate groups and counterions, and said counterions consisting essentially of sodium ions; and wherein the sodium ionomer has a melt flow rate of about 0.7 to about 25 g/10 min and a freeze enthalpy that is not detectable or that is less than about 3.0 j/g, when determined by differential scanning calorimetry in accordance with ASTM D3418; and
   (b) said sodium/zinc mixed ionomer comprises carboxylate groups and a combination of counterions; said combination of counterions consisting essentially of about 1 to about 99 equivalent % of sodium cations and about 99 to about 1 equivalent % of zinc cations, based on the total number of equivalents of carboxylate groups in the sodium/zinc mixed ionomer.

2. The composition of claim 1, wherein about 30% to about 90% of the acid moieties of the precursor acid copolymer are neutralized to form the sodium/zinc mixed ionomer.

3. The composition of claim 1, wherein about 40% to about 70% of the acid moieties of the precursor acid copolymer are neutralized to form the sodium/zinc mixed ionomer.

4. The composition of claim 1, wherein the sodium/zinc mixed ionomer has a melt flow rate (MFR) of about 0.7 to about 35 g/10 min at 190° C. and 2.16 kg.

5. The composition of claim 1, wherein the precursor acid copolymer comprises about 20 to about 25 wt % of copolymerized units of the α,β-ethylenically unsaturated carboxylic acid.

6. The composition of claim 1, wherein the combination of counterions consists essentially of about 50 to about 95 equiv % of the sodium cations and about 5 to about 50 equiv % of the zinc cations.

7. An article comprising or produced from the composition of claim 1.

8. The article of claim 7 that is in the form of a film or a sheet or a molded article.

9. The article of claim 8 that is a film or sheet prepared by a process selected from the group consisting of dipcoating, solution casting, lamination, melt extrusion, blown film, extrusion coating, and tandem extrusion coating.

10. The article of claim 8 that is a molded article prepared by a process selected from the group consisting of compression molding, injection molding, extrusion molding, and blow molding.

11. The article of claim 10 that is an injection molded article.

12. The article of claim 11 that has a minimum thickness of at least about 3 mm.

13. The article of claim 11 that has a multi-layer structure having at least one layer that consists essentially of the composition, said at least one layer having a minimum thickness of at least about 1 mm.

14. The article of claim 13 that is a container.

15. The article of claim 11 that is a sheet, a container, a cap or stopper, a tray, a medical device or instrument, a handle, a knob, a push button, a decorative article, a panel, a console box, or a footwear component.

16. The article of claim 15 that is a container.

17. The article of claim 11 that is produced by a process selected from the group consisting of co-injection molding; over-molding; injection blow molding; injection stretch blow molding and extrusion blow molding.

18. An article prepared by injection molding, said article consisting essentially of the composition of claim 1 and having a thickness of about 1 to about 100 mm.

* * * * *